(12) United States Patent
Kawabata et al.

(10) Patent No.: US 7,328,627 B2
(45) Date of Patent: *Feb. 12, 2008

(54) SEAT LOAD DETECTING DEVICE AND MOUNTING STRUCTURE THEREOF

(75) Inventors: Hideki Kawabata, Chita-gun (JP); Kan Ichihara, Kariya (JP); Muneto Inayoshi, Anjo (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 74 days.

This patent is subject to a terminal disclaimer.

(21) Appl. No.: 11/283,888

(22) Filed: Nov. 22, 2005

(65) Prior Publication Data

US 2006/0107767 A1    May 25, 2006

(30) Foreign Application Priority Data

Nov. 22, 2004    (JP)    ............... 2004-337982

(51) Int. Cl.
G01L 1/04    (2006.01)
G01L 1/22    (2006.01)

(52) U.S. Cl. ................................. 73/862.627
(58) Field of Classification Search ............ 73/862.627
See application file for complete search history.

(56) References Cited

U.S. PATENT DOCUMENTS 6,005,199 A * 12/1999 Harada et al. ............... 177/211
6,349,602 B1 * 2/2002 Hamada et al. ................ 73/782
6,356,200 B1 * 3/2002 Hamada et al. ............. 340/667
6,670,560 B2 * 12/2003 Curtis ......................... 177/144
6,684,718 B2 * 2/2004 Muraishi ................ 73/862.474
6,729,193 B2 * 5/2004 Ishida .................... 73/862.627
6,732,593 B2 * 5/2004 Sakamoto et al. ............ 73/856
7,096,745 B2 * 8/2006 Kobata ................... 73/862.041
7,189,931 B2 * 3/2007 Hida et al. .................. 177/144
2006/0170259 A1 * 8/2006 Inayoshi et al. .......... 297/217.3

FOREIGN PATENT DOCUMENTS

JP    2003-083798 A    3/2003
JP    2004-268620 A    9/2004

* cited by examiner

*Primary Examiner*—Michael Cygan
*Assistant Examiner*—Octavia Davis
(74) *Attorney, Agent, or Firm*—Buchana Ingersoll & Rooney PC

(57) ABSTRACT

In a seat load detecting device, sensor bodies are interposed between an upper rail and respective lower brackets. Each sensor body includes an annular strain portion which axial line extends vertically, an outer peripheral holder which is mounted to the upper rail and which holds an outer peripheral edge of the strain portion, and an inner peripheral holder which is mounted to the lower bracket and which holds an inner peripheral edge of the strain portion. Strain gauges for detecting a load applied to a seat on the basis of a strain amount between an outer periphery and an inner periphery of each strain portion are disposed on each strain portion. A second clamping member of each inner peripheral holder has a mounting hole which is formed through the second clamping member in a widthwise direction thereof and which rockably connects the lower bracket.

10 Claims, 4 Drawing Sheets

SEAT LOAD DETECTING DEVICE AND MOUNTING STRUCTURE THEREOF

CROSS REFERENCE TO RELATED APPLICATIONS

This application is based on and claims priority under 35 U.S.C. §119 with respect to Japanese Patent Application No. 2004-337982 filed on Nov. 22, 2004, the entire content of which is incorporated herein by reference.

BACKGROUND OF THE INVENTION

1. Field of the Invention

The present invention relates to a seat load detecting device and a mounting structure thereof.

2. Description of the Related Art

Hitherto, a seat load detecting device disclosed in, for example, Japanese Unexamined Patent Application Publication No. 2003-83798 (FIGS. 3 and 4) has been known as a seat load detecting device. This seat load detecting device has a rectangular cantilever strain member 21 having a strain gauge 22. More specifically, one end of the strain member is secured to a sitting portion side of a seat through a substantially L-shaped cross-section bracket 23, while the other end of the strain member is secured to and supported by a vehicle body side of the seat through a substantially L-shaped cross-section bracket 24. In such a structure, when the one end of the strain member is flexed with respect to the other end thereof by a load applied to the seat, an output signal of the strain gauge is varied in accordance with the flexing amount in order to detect the load.

However, in this sheet load detecting device, the substantially L-shaped cross-section brackets are required in mounting the seat. Therefore, the size and weight of the device as a whole are inevitably increased. In addition, since the strain member has a cantilever structure, a stopper structure (indicated by reference numerals 25a and 27a) for restricting a vertical strain amount of the strain member to a predetermined amount to provide a seat supporting strength is required. Therefore, the structure becomes complicated.

A seat load detecting device, such as that disclosed in, for example, Japanese Unexamined Patent Application Publication No. 2004-268620 (FIGS. 1 to 4), which makes it possible to overcome an increase in size, etc., of the device as a whole is known. This seat load detecting device comprises a flange 20 in contact with and mounted to a surface of an upper rail 42 and a bolt unit 30 perpendicularly formed with respect to the flange so as to be integrally formed with a disc-shaped strain portion 14 that is mounted to a recess 24 of the flange. The bolt unit is mounted to a bracket 48 through a nut 66. The bracket 48 is used for mounting a seat. A sensor 12 for detecting a load applied to the bolt unit in an axial direction is disposed at the strain portion. In such a structure, when the inner peripheral side of the strain portion is flexed with respect to its outer peripheral side due to the load that is applied to the bolt unit in the axial direction by a load applied to the seat, an output signal of the sensor varies in accordance with the flexing amount in order to detect the load. In particular, since the strain portion has what is called a diaphragm structure, a seat supporting strength is sufficiently provided while the device is compact.

However, in the seat load detecting device disclosed in Japanese Unexamined Patent Application Publication No. 2004-268620, when there is a mounting error caused by forward/backward tilting between the bolt unit and the bracket for mounting the seat, the mountability of these components is reduced. When parts precision and mounting precision are increased in order to reduce such a mounting error, costs are increased.

In a state after the mounting, when a load which tries to tilt the bracket in the forward/backward direction remains, a moment of a force acting upon the bolt unit causes an unnecessary strain to occur in the strain portion, thereby reducing the precision with which the load is detected.

SUMMARY OF THE INVENTION

Accordingly, it is an object of the present invention to provide a seat load detecting device which can increase mountability and detection precision, and a mounting structure of the seat load detecting device.

To this end, according to a first aspect of the present invention, there is provided a seat load detecting device interposed between a floor-side seat securing member and a seat-side securing member and detecting a load applied to a seat. The detecting device comprises an annular strain portion which axial line extends vertically for a floor secured to the seat, an outer peripheral holder mounted to the floor-side seat securing member and holding an outer peripheral edge of the strain portion, an inner peripheral holder mounted to the seat-side securing member and holding an inner peripheral edge of the strain portion, and at least one detecting element disposed at the strain portion and detecting the load applied to the seat on the basis of an amount of strain between an outer periphery and an inner periphery of the strain portion. The inner peripheral holder has a mounting hole which is disposed in a widthwise direction of the inner peripheral holder and which rockably connects the seat-side securing member.

According to a second aspect of the present invention, there is provided a mounting structure of a seat load detecting device interposed between a floor-side seat securing member and a seat-side securing member and detecting a load applied to a seat. The mounting structure comprises a mounting hole and a fastener. The mounting hole is disposed in a widthwise direction of an inner peripheral holder. The fastener is disposed in the mounting hole, passes through the seat-side securing member, and rockably connects the seat-side securing member and the inner peripheral holder with each other. The seat load detecting device comprises an annular strain portion which axial line extends vertically for a floor secured to the seat, an outer peripheral holder mounted to the floor-side seat securing member and holding an outer peripheral edge of the strain portion, an inner peripheral holder mounted to the seat-side securing member and holding an inner peripheral edge of the strain portion, and a detecting element disposed at the strain portion and detecting the load applied to the seat on the basis of an amount of strain between an outer periphery and an inner periphery of the strain portion.

In each of the relevant seat load detecting devices and the mounting structure, a mounting hole is formed in the inner peripheral holder (second clamping member) so as to extend therethrough in the widthwise direction. The seat-side securing member which is rockably connected to the mounting hole is allowed to rotate slightly, that is, tilt in the forward/backward direction with respect to the axial line of the mounting hole serving as the axis of rotation. Therefore, a mounting error caused by tilting in the forward/backward direction between the seat-side securing member and the inner peripheral holder (second clamping member) is absorbed within a range allowing the rocking of these components, so that a smooth mounting can be achieved. In addition, since a load which tries to tilt the seat-side securing member in the forward/backward direction during the mounting is removed, unnecessary strain caused by a moment of force generated between the seat-side securing member and the inner peripheral holder (second clamping member) holding the inner peripheral edge of the strain portion is reduced, so that detection precision can be increased.

In the third form, the seat-side securing member is connected to the mounting hole on the axial line of the inner peripheral holder. Therefore, a load which is transmitted from the seat through the seat-side securing member is transmitted to the inner peripheral holder, etc., after absorbing a force component other than an axial force component through the mounting hole, so that unnecessary strain is reduced, thereby making it possible to increase detection precision.

DESCRIPTION OF THE PREFERRED EMBODIMENT

An embodiment of the present invention will hereunder be given with reference to the drawings.

Figure 1:
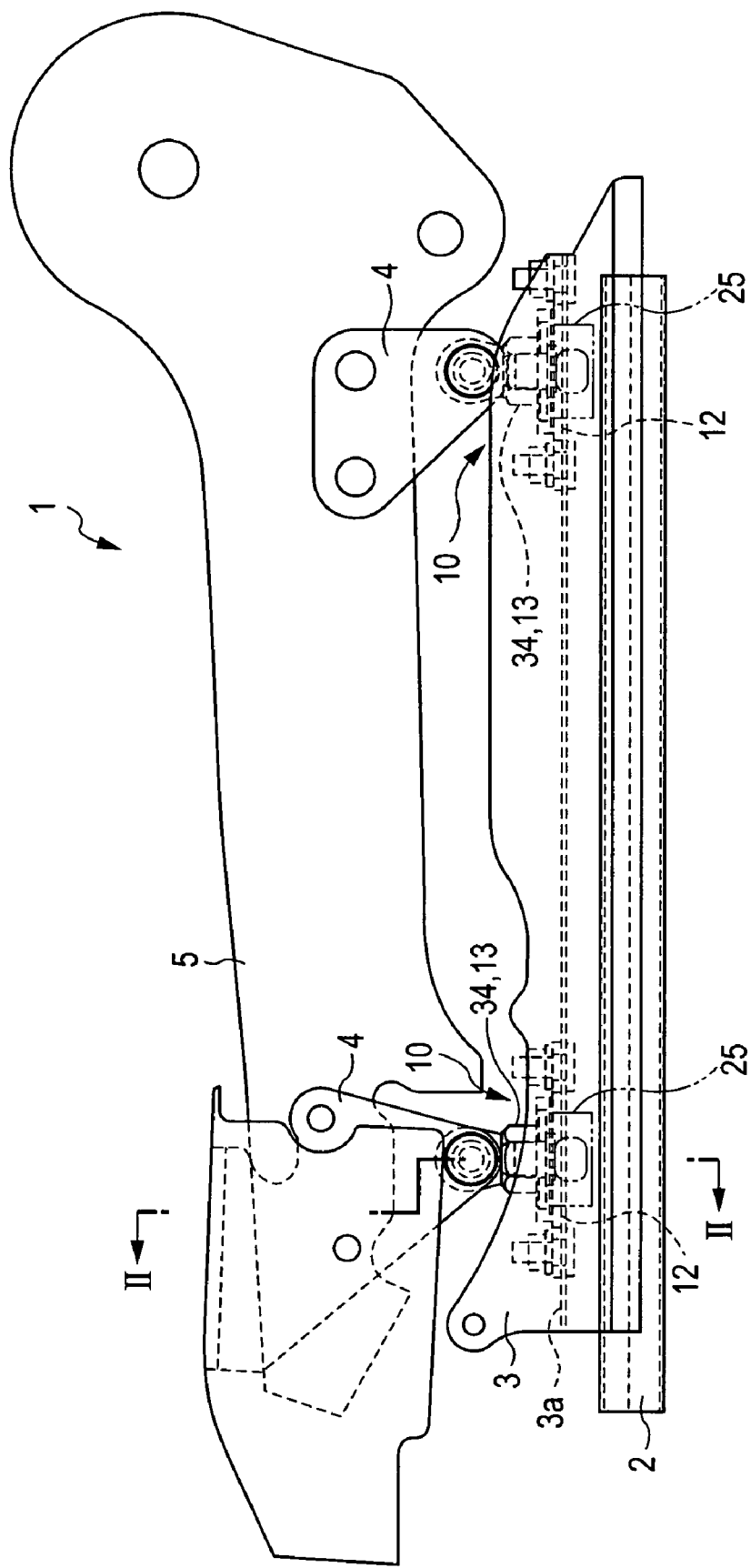
FIG. 1 is a schematic view of a seat body to which the present invention is applied.
Figure 2:
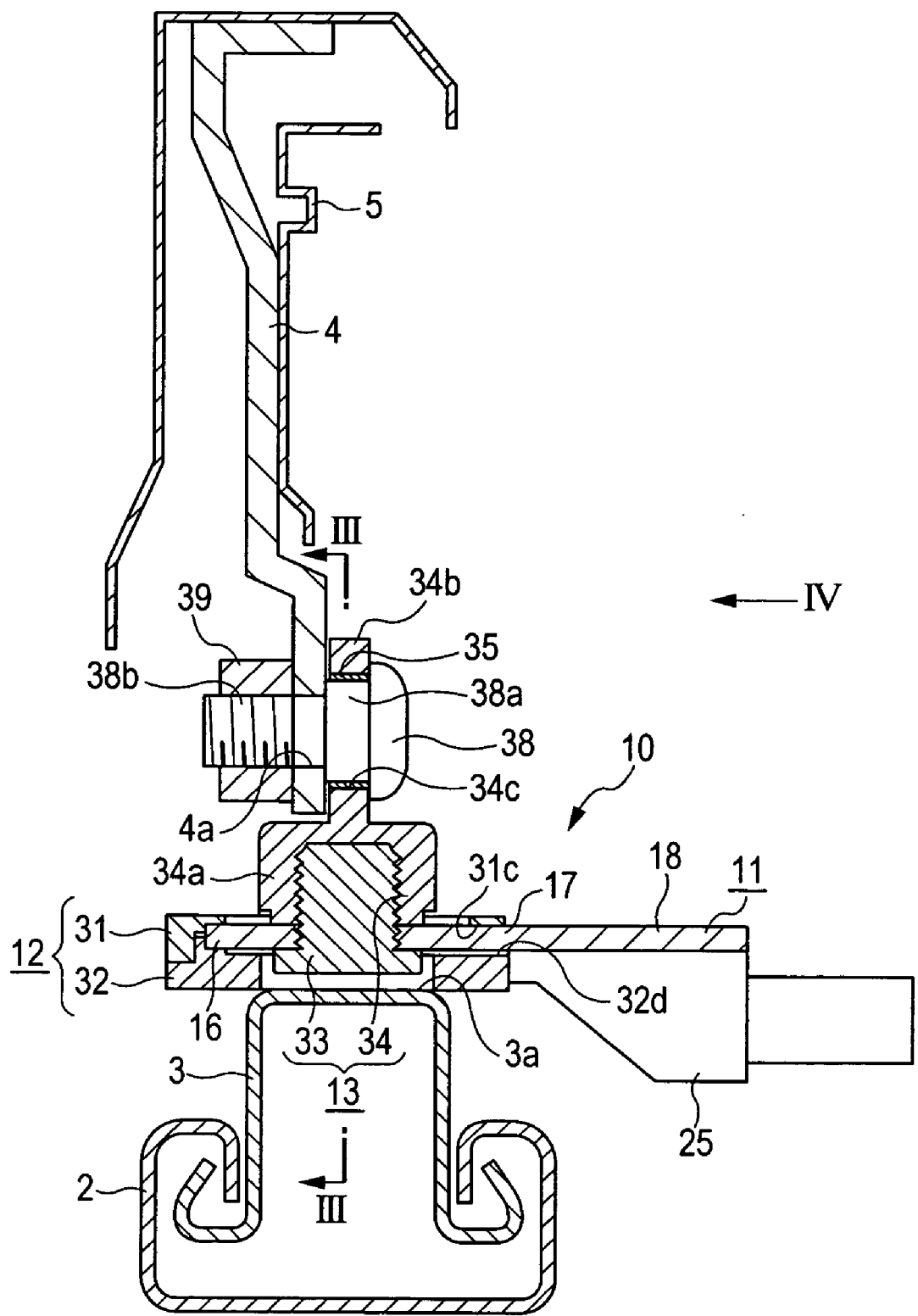
FIG. 2 is a sectional view taken along line II-II in FIG. 1.
Figure 3:
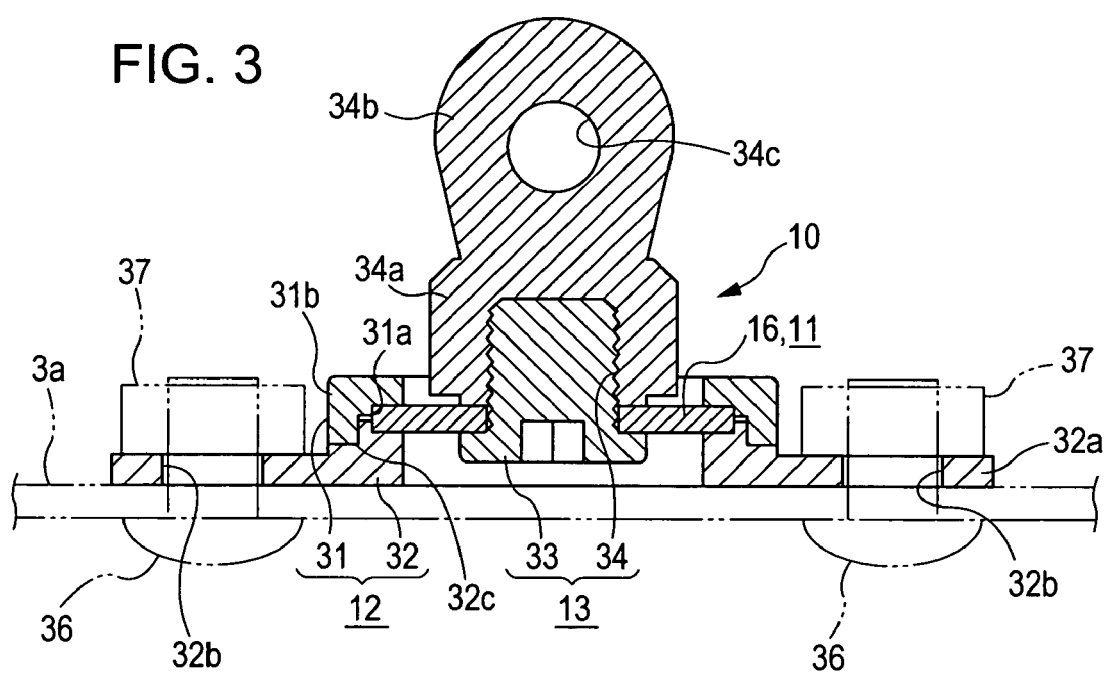
FIG. 3 is a sectional view taken along line III-III in FIG. 2.
Figure 4:
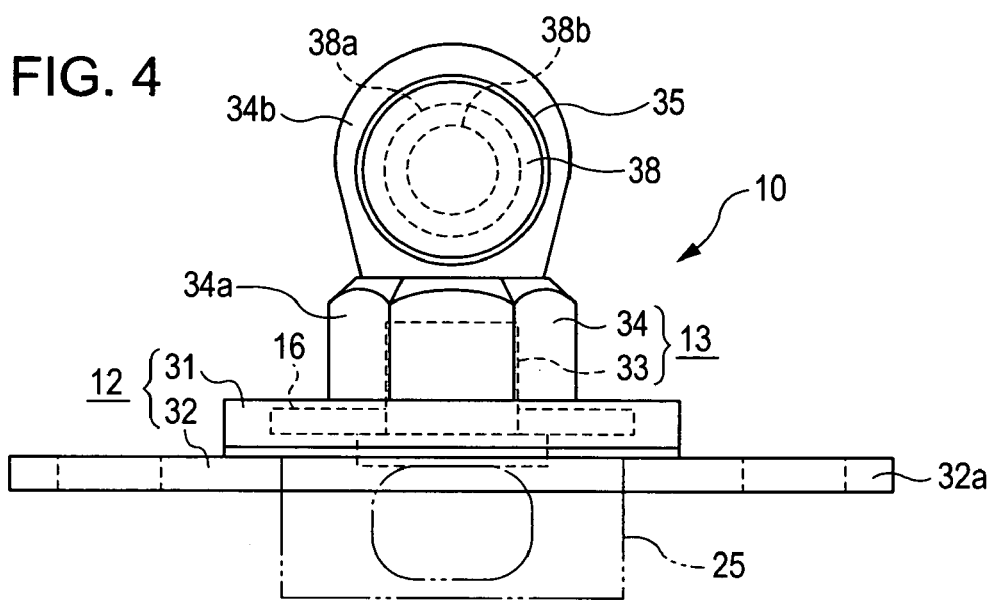
FIG. 4 is an elevational view taken along arrow IV in FIG. 2.

FIG. 1 is a side view of a skeletal structure of a seat body 1 which is mounted to a passenger seat side of a vehicle, such as an automobile. FIG. 2 is a sectional view taken along line II-II in FIG. 1. FIG. 3 is a sectional view taken along line III-III in FIG. 2. FIG. 4 is an elevational view taken along arrow IV in FIG. 2. Another skeletal structure like that shown in FIG. 1 is also disposed In FIG. 6. These skeletal structures form a pair in a widthwise direction of a seat body 1 (that is, in a direction perpendicular to the sheet plane in FIG. 1). Accordingly, in the side view of FIG. 1, the skeletal structure on the left as seen in a forward direction of the vehicle is shown as viewed from the outer side of the seat. The skeletal structure on the right as seen in the forward direction of the vehicle has the same form. Therefore, only the left skeletal structure will hereunder be described as a representative structure.

As shown in FIG. 1, a lower rail 2 extending in a forward/backward direction of the vehicle is secured to a vehicle floor. As shown in FIG. 2, the lower rail 2 has a U-shaped cross section so as to have an open upper side. Each end of the open upper side is bent towards widthwise-direction inner sides (that is, left and right inner sides in FIG. 2) and is folded downward. An upper rail 3, serving as a floor-side seat securing member, has a U-shaped cross section so as to have an open lower side. Each end of the open lower side is bent towards widthwise-direction outer sides and is folded upward. The upper rail 3 has a flat surface 3a protruding upward from a widthwise-direction central portion of the upper rail 3. The upper rail 3 which folded portions are vertically placed upon the folded portions of the lower rail 2 is mounted so as to be movable in the forward/backward direction with respect to the lower rail 2.

As shown in FIG. 1, lower brackets 4, serving as seat-side securing members disposed apart by a predetermined interval, are supported at a flat surface 3a of the upper rail 3 through a pair of front and back sensor bodies 10. A lower arm 5, which forms the skeletal structure of a seat cushion, is secured to and supported by these lower brackets 4.

The sensor bodies 10, which are interposed between the upper rail 3 and their respective brackets 4, detect a load applied to the seat (that is, a vertical load applied to the seat cushion). As shown in FIG. 2, each sensor body 10 comprises a plate member 11, an outer peripheral holder 12, and an inner peripheral holder 13.

Figure 5:
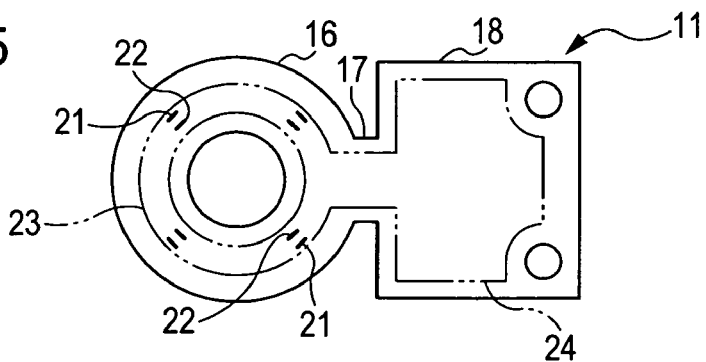
FIG. 5 is a plan view of a plate member shown in FIG. 2.

Each plate member 11 is flat. As shown in FIG. 5, in each plate member 11, an annular strain portion 16 and a base (base portion) 18 extending in a diametrical direction of the strain portion 16 through a neck 17 are integrally formed. Each plate member 11 in which an axial line of the strain portion 16 extends vertically relative to the vehicle floor secured to the seat is disposed between the upper rail 3 and its associated lower bracket 4 (see FIG. 2). Pairs of strain gauges (such as thick-film gauges) 21 and 22, serving as detecting elements, are disposed apart from each other by a predetermined distance in the diametrical direction on each strain portion 16. These strain gauges 21 and 22 are concentrically disposed so that each strain gauge 21 is disposed closer to the outer periphery of the strain portion 16 than its associated strain gauge 22. These strain gauges 21 and 22 are, along with a wiring portion 23 on the associated strain portion 16, formed by printing. On the basis of a strain amount between the outer periphery and the inner periphery of each strain portion 16, the strain gauges 21 and 22 output through the associated wiring portion 23 signals which are in accordance with the load that is applied to the associated strain portion 16 in the axial direction.

Each wiring portion 24 which is disposed continuously with the wiring portion 23 on the associated strain portion 16 through the neck 17 is formed by printing. An electrical circuit (not shown) is mounted to each base 18 in accordance with this associated wiring portion 24. Accordingly, each electrical circuit mounted to its associated base 18 is electrically connected to the strain gauges 21 and 22 through the wiring portions 23 and 24 and the like. Each electrical circuit includes, for example, an amplifier, and detects a load applied to the seat by processing the output signals from the strain gauges 21 and 22. Each connector 25 for electrical connection with an external power supply line or an external signal wire is fastened to the associated base 18 to which the electrical circuit is mounted (refer to FIG. 2).

As shown in FIGS. 2 and 3, each outer peripheral holder 12 comprises a first holder portion 31 and a second holder portion 32. Each first holder portion 31 has an internal diameter that is smaller than the external diameter of the strain portion 16 and an external diameter that is larger than the external diameter of the strain portion 16, and is annular. A stepped portion 31a and a protruding wall 31b are formed at each of the first holder portion 31. Each stepped portion 31a has an internal diameter that is equal to the external diameter of the strain portion 16 and protrudes towards one side in the axial direction (that is, towards the lower side in FIG. 3 corresponding to where the second holder portion 32 is disposed). Each protruding wall 31b is disposed at the outer periphery of its associated stepped portion 31a and protrudes in the form of a disc towards one side in the axial direction. In other words, each first holder portion 31 protrudes in a stepped form at one side in the axial direction and in the direction of its outer periphery.

Each strain portion 16 having a portion of its outer peripheral surface fitted to the stepped portion 31*a* is such that its outer peripheral edge of an end face at the other side in the axial direction (upper side in FIG. 3) contacts the first holder portion 31. The strain gauges 21 and 22, etc., which are printed to the associated plate member 11, are disposed at the lower side in FIG. 3, that is, where the associated second holder portion 32 is disposed. Each strain portion 16 is joined to the associated first holder portion 31 along a portion at the inner peripheral side where the end face at the other side in the axial direction of each strain portion 16 contacts the first holder portion 31. A notch 31*c* for guiding its associated base 18 to the outside through the neck 17 of its associated plate member 11 is formed in the associated first holder portion 31 (see FIG. 2).

Each second holder portion 32 has an annular shape having an internal diameter and an external diameter that are equal to those of the first holder portion 31. Flanges 32*a* extending to both outer sides in the diametrical direction are formed at the respective second holder portions 32. These flanges 32*a* are disposed so that their directions of extension are perpendicular to the directions of extension of the bases 18 of the respective plate members 11. A pair of bolt holes 32*b* are formed in each of the flanges 32*a* so that the bolt holes 32*b* are disposed at the two outer sides in the diametrical direction, respectively, and extend through the flanges 32*a* vertically.

Each annular fitting wall 32*c* having an internal diameter that is equal to the internal diameter of the associated first holder portion 31 and an external diameter that is equal to the internal diameter of the associated protruding wall 31*b* is formed in the associated second holder portion 32. Each fitting wall 32*c* has a stepped form corresponding to the external shape of the associated strain portion 16 fitted to the associated stepped portion 31*a* and the inner peripheral surface of the associated protruding wall 31*b*. The first and second holder portions 31 and 32 are mounted by fitting the protruding walls 31*b* and the respective fitting walls 32*c*.

Each strain portion 16 having a remaining portion of its outer peripheral surface fitted to the inner peripheral surface of its associated fitting wall 32*c* is such that the outer peripheral edge at an end face at one side in the axial direction (lower side in FIG. 3) is in contact with the bottom surface. In other words, the outer peripheral edge of each strain portion 16 is sandwiched between the first and second holder portions 31 and 32. A notch 32*d* for guiding the associated base 18 to the outside through the neck 17 of the associated plate member 11 is formed in each second holder portion 32 (fitting wall 32*c*). (Refer to FIG. 2.)

The first and second holder portions 31 and 32 are superimposed upon each other at the outer sides in a diametrical direction thereof, and have parallel contact surfaces in a direction perpendicular to an axial direction thereof (that is, in the diametrical direction) at the diametrical-direction outer side. In the embodiment, welding, such as laser beam welding, which is oriented in the diametrical direction is performed on the diametrical outer sides of the first and second holder portions 31 and 32 that are superimposed in the axial direction. As a result, the first and second holder portions 31 and 32 are welded considerably along the contact surfaces and are secured.

Each inner peripheral holder 13 comprises a first clamping member 33 and a second clamping member 34. A threaded shaft of each first clamping member 33 has an external diameter that is equal to the internal diameter of its associated strain portion 16, and is inserted into the strain portion 16 from one side in the axial direction (lower side in FIG. 3). The head of each first clamping member 33 contacts the inner peripheral edge of an end face at one side in the axial direction (lower side in FIG. 3) of the associated strain portion 16. A predetermined gap is set between an end face at one side in the axial direction of each second holder portion 32 and the head of the associated first clamping member 33, so that a strain is allowed between the outer peripheral side and the inner peripheral side of each strain portion 16.

Each second clamping member 34 is what is called an eyenut having a mounting hole in its associated head. In each second clamping member 34, a nut fastening portion 34*a* and a mounting portion 34*b*, provided in a standing manner along an axial line (center axis) of the fastening portion 34*a*, are integrally formed. The fastening portion 34*a* of each second clamping member 34 is fastened to the threaded shaft of the associated first clamping member 33 inserted in the associated strain portion 16, and contacts the inner peripheral edge of the end face of the other side in the axial direction (upper side in FIG. 3) of its associated strain portion 16. The external diameter of a portion where the second clamping member 34 contacts the associated strain portion 16 is set equal to the external diameter of the head of its associated first clamping member 33. In other words, the inner peripheral edge of each strain portion 16 is clamped by the associated first clamping member 33 and second clamping member 34 (fastening portion 34*a*).

A mounting hole 34*c* is formed in each mounting portion 34*b* so as to extend through a central portion thereof in a thickness direction. With each second clamping member 34 being fastened to the threaded shaft of its associated first clamping member 33, each mounting hole 34*c* is formed through the associated mounting portion 34*b* in the widthwise direction (of the upper rail 3). The direction in which each mounting hole 34*c* is formed through its associated mounting portion 34*b* is the same as the direction of extension of its associated base 18. A bush 35 having an external diameter that is equal to the internal diameter of the associated mounting hole 34*c* is mounted to the associated mounting hole 34*c*. Each bush 35 is prevented from being dislodged by sandwiching the associated mounting portion 34*b* with outwardly facing flanges formed on both axial-direction ends of each bush 35. Although the mounting holes 34*c* are formed in the respective second clamping members 34, mounting holes may be formed in either the first clamping members 33 or the second clamping members 34.

As shown in FIG. 3, each sensor body 10 in which the direction of extension of its associated flange 32*a* is the same as the longitudinal direction of the upper rail 3 is placed on the flat surface 3*a*. Here, each plate member 11 is disposed and supported in correspondence with the widthwise direction inner sides where the direction of extension of the associated base 18 is perpendicular to the direction of extension of the associated flange 32*a* (see FIG. 2). This prevents each connector 25, which is fastened to its associated base 18, from interfering with the upper rail 3. Each body sensor 10 is fastened to the upper rail 3 by fastening associated nuts 37 to bolt portions of bolts 36 passing through the bolt holes 32*b* through the flat surface 3*a*. The outer peripheral holders 12 (second holder portions 32) are fastened to two locations of the upper rail 3 with the bolts 36 and the nuts 37 in order to restrict relative rotation of these outer peripheral holders 12 with respect to the upper rail 3.

As shown in FIG. 2, bolts 38 are inserted in the bushes 35 mounted to the respective mounting holes 34*c*. Each bolt 38 has a large diameter portion 38a and a bolt portion 38b. Each large diameter portion 38a has an external diameter that is slightly smaller than the internal diameter of the bush 35 and the same axial length as the bush 35. Each bolt portion 38b protrudes from its associated large diameter portion 38a. Each bolt 38 is inserted into the associated bush 35, mounted to the associated mounting hole 34c, from the widthwise inner side, and is supported with a slight gap between the bush 35 and the large diameter portion 38a.

A mounting hole 4a is formed in each lower bracket 4 so that it extends through its associated lower bracket 4 in the widthwise direction. The internal diameter of each mounting hole 4a is equal to the external diameter of its associated bolt portion 38b. The lower brackets 4 are supported by the respective second clamping members 34 (inner peripheral holders 13) with the bolt portions 38b passing through the bushes 35 (mounting holes 34c) being inserted in their respective mounting holes 4a. The sensor bodies 10 (inner peripheral holders 13) are fastened to the lower brackets 4 by fastening respective securing nuts 39 to the bolt portions 38b protruding towards a widthwise-direction outer side of the mounting holes 4a.

The sensor bodies 10 (inner peripheral holders 13) and the lower brackets 4 (lower arm 5) are rockable in the range of the gaps between the bushes 35 and the respective large diameter portions 38a. In other words, the lower brackets 4 securing and supporting the lower arm 5 are allowed to rotate slightly (that is, to tilt in the forward/backward direction) with respect to axial lines of the respective bushes 35, etc., serving as axes of rotation. They are allowed to rotate so that a mounting error caused by tilting of the lower brackets 4 and the sensor bodies 10 (inner peripheral holders 13) in the forward/backward direction is absorbed to increase the mountability of these parts, etc.

In such a structure, when a load is applied to the seat, an axial load is applied to the strain portions 16 of the sensor bodies 10, causing strain to occur between the outer peripheral sides and the inner peripheral sides of the respective strain portions 16. The strain gauges 21 and 22, which are printed on the strain portions 16, output signals in accordance with the strain amount. The output signals of the strain gauges 21 and 22 are processed at the electrical circuits mounted to the respective bases 18 in order to detect the load applied to the seat.

As described in detail above, according to the embodiment, the following advantages are provided.

(1) In the embodiment, a mounting error caused by tilting in the forward/backward direction between the lower brackets 4 and the second clamping members 34 (inner peripheral holders 13) is absorbed within rocking allowable ranges in the gaps between the bushes 35 and the respective large diameter portions 38a, so that mounting can be smoothly carried out. During the mounting, since the load which tries to tilt the lower brackets 4 in the forward/backward direction is removed, unnecessary strain caused by a moment of force generated between the lower brackets 4 and the respective second clamping members 34 (inner peripheral holders 13) is reduced, so that detection precision can be increased.

(2) In the embodiment, the lower brackets 4 securing the lower arm 5 are supported by the mounting portions 34b which are provided in a standing manner along the axial lines (center lines) of the respective fastening portions 34a (inner peripheral holders 13). In other words, the lower brackets 4 are connected at the mounting holes 34c disposed on the axial lines of the respective inner peripheral holders 13. Therefore, the load transmitted from the top portion of the seat through the lower brackets 4 is transmitted to the fastening portions 34a (inner peripheral holders 13) and the like after absorbing a force component other than an axial force component through the respective mounting holes 34c (mounting portions 34b), thereby reducing unnecessary strain. Consequently, detection precision is increased.

(3) In the embodiment, the mounting holes 34c are formed in the second clamping members 34 clamping the inner peripheral edges of the respective strain portions 16 so that they extend through the second clamping members 34 in the widthwise direction. Therefore, even if, in terms of space, it is difficult to connect the inner peripheral holders 13 and the respective lower brackets (lower arm) by mounting the fastening components, such as the bolts and nuts, vertically, it is possible to use the mounting holes 34c of the second clamping members 34 and mount these fastening components in the widthwise direction (direction in which the mounting holes 34c are formed through the second clamping members 34) to secure these component parts. Therefore, it is possible to increase the design freedom without increasing the number of parts.

(4) In the embodiment, since the flanges 32a are formed without axially projecting the second holder portions 32 and are directly fastened to the upper rail 3, the sensor bodies 10 can be thinner. In addition, it is possible to increase the mountability of the sensor bodies 10 to the seat body. Further, compared to the case in which brackets and the like are separately provided for fastening to the upper rail 3 and the like, it is possible to reduce the number of parts and costs.

(5) In the embodiment, since the strain amount is detected with the strain gauges (thick-film gauges) 21 and 22 producing strong output signals (large gauge outputs), it is possible to make the sensor bodies 10 small and thin as a whole. In addition, it is possible to increase the mountability of the sensor bodies 10 to the seat body 1 (between the upper rail 3 and the lower brackets 4). Further, since each strain portion 16 has what is called a diaphragm structure, a seat supporting strength can be sufficiently provided while the device is compact.

The embodiment may be modified as follows.

Figure 6:
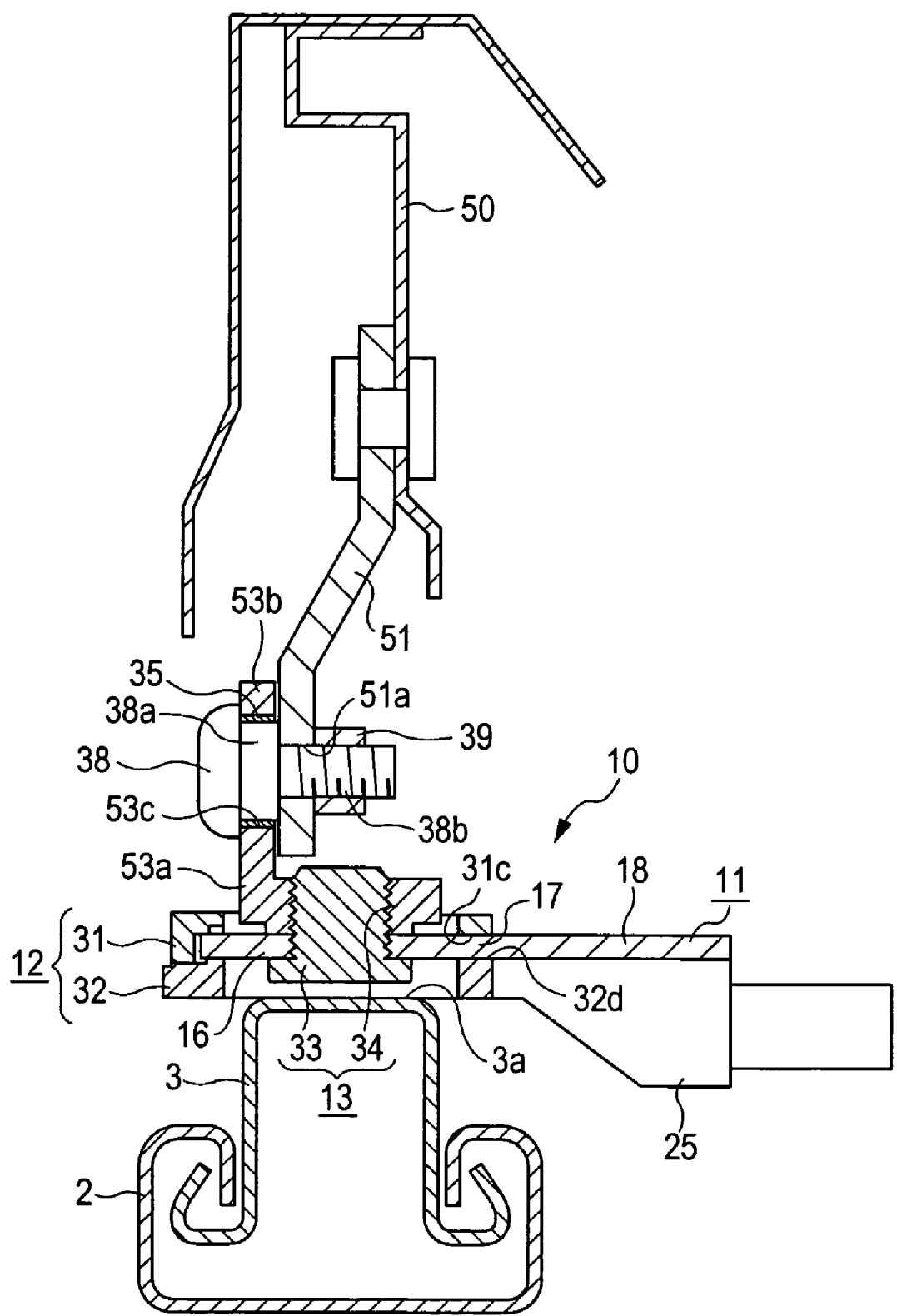
FIG. 6 is a sectional view of a modification of the present invention.

In the embodiment, the mounting portions of the second clamping members may be disposed in a standing manner so as to be shifted from the axial lines of the respective fastening portions and set parallel with the axial direction. In other words, as shown in FIG. 6, in correspondence with lower brackets 51 having a shape that is different from that of the lower brackets in the embodiment and a lower arm 50 secured to and supported by the lower brackets 51, second clamping members 53 (which, along with the first clamping members 33, are portions of the inner peripheral holders 13) each comprise a nut fastening portion 53a and a mounting portion 53b disposed in a standing manner so as to be shifted from the axial line (center line) of the fastening portion 53a and set parallel with the axial direction, with the nut fastening portion 53a being integrated to the associated mounting portion 53b.

Each mounting portion 53b has a mounting hole 53c formed through the central portion thereof in the thickness direction. With each second clamping member 53 being fastened to the threaded shaft of its associated first clamping member 33, each mounting hole 53c is formed through the associated mounting portion 53b in the widthwise direction (that is, the widthwise direction of the upper rail 3). The bushes 35 are mounted to the respective mounting holes 53c.

Mounting holes 51a are formed through the respective lower brackets 51 in the widthwise direction. The lower brackets 51 are supported by the respective second clamping members 53 (inner peripheral holders 13) by inserting into the mounting holes 51a bolt portions 38b of bolts 38 that are inserted from the widthwise outer side into the bushes 35, mounted to the respective mounting holes 53c, and that pass through the bushes 35. The sensor bodies (inner peripheral holders 13) are fastened to the respective lower brackets 51 by fastening the securing nuts 39 to the bolt portions 38b protruding towards the widthwise inner sides of the respective mounting holes 51a.

As in the embodiment, the sensor bodies (inner peripheral holders 13) and the lower brackets 51 (lower arm 50) are rockable within the ranges of the gaps between the bushes 35 and the respective large diameter portions 38a. In this modification, by adjusting the amount of shift of each mounting portion 53b with respect to its associated fastening portion 53a from the axial line, it is possible to connect these to, for example, lower arms having various shapes.

In the embodiment, instead of the bushes 35, cylindrical collars may be mounted to the mounting holes 34c or 53c. As long as the sensor bodies (inner peripheral holders 13) and the lower brackets are rockable, the bushes may be omitted.

In the embodiment, the securing nuts 39 and the bolts 38, serving as fasteners, may be replaced with, for example, rivet pins.

In the embodiment, as long as the portion where strain essentially occurs between each outer peripheral holder 12 and its associated inner peripheral holder 13 is annular, the external shape of each strain portion 16 may be rectangular.

In the embodiment, the lower brackets and the lower arm may be integrally formed.

What is claimed is:

1. A seat load detecting device interposed between a floor-side seat securing member and a seat-side securing member and detecting a load applied to a seat, the detecting device comprising:
   an annular strain portion with an axial line that extends vertically;
   an outer peripheral holder mounted to the floor-side seat securing member and holding an outer peripheral edge of the strain portion;
   an inner peripheral holder mounted to the seat-side securing member, holding an inner peripheral edge of the strain portion, and having a mounting hole whose axis is oriented in a widthwise direction of the seat and which permits rockable connection to the seat-side securing member; and
   at least one detecting element disposed at the strain portion and detecting the load applied to the seat on the basis of an amount of strain between an outer periphery and an inner periphery of the strain portion.

2. The seat load detecting device according to claim 1, wherein the inner peripheral holder includes first and second clamping members clamping the inner peripheral edge of the strain portion with an axial line of the inner peripheral holder extending vertically, and wherein either one of the first and second clamping members has the mounting hole.

3. The seat load detecting device according to claim 1, wherein a bush for rockably supporting the seat-side securing member is mounted to the mounting hole.

4. The seat load detecting device according to claim 1, wherein the mounting hole is disposed on an axial line of the inner peripheral holder.

5. The seat load detecting device according to claim 1, further comprising a flat plate member including the strain portion, a base, and a neck disposed between the base and the strain portion.

6. The seat load detecting device according to claim 5, wherein the at least one detecting element comprises a plurality of pairs of strain gauges disposed apart by a predetermined angle on the strain portion.

7. The seat load detecting device according to claim 6, wherein the pairs of strain gauges are concentrically disposed with respect to the strain portion.

8. The seat load detecting device according to claim 5, wherein the at least one detecting element comprises a strain gauge, and a connector for extracting a detecting signal from the strain gauge.

9. The seat load detecting device according to claim 5, wherein the outer peripheral holder includes first and second holder portions, and the plate member is clamped by the first and second holder portions from an axial direction thereof.

10. A mounting structure of a seat load detecting device interposed between a floor-side seat securing member and a seat-side securing member and detecting a load applied to a seat, the mounting structure comprising:
   an annular strain portion with an axial line that extends vertically;
   an outer peripheral holder mounted to the floor-side seat securing member and holding an outer peripheral edge of the strain portion;
   an inner peripheral holder mounted to the seat-side securing member and holding an inner peripheral edge of the strain portion; and
   at least one detecting element disposed at the strain portion and detecting the load applied to the seat on the basis of an amount of strain between an outer periphery and an inner periphery of the strain portion;
   a mounting hole whose axis is oriented in a widthwise direction of the seat; and
   a fastener disposed in the mounting hole, passing through the seat-side securing member, and rockably connecting the seat-side securing member and the inner peripheral holder with each other.

* * * * *